(12) United States Patent
Goldner (10) Patent No.: US 8,185,152 B1
(45) Date of Patent: May 22, 2012

(54) ACCESS NETWORK DISCOVERY AND SELECTION AND INTERNET PROTOCOL MULTIMEDIA SYSTEM SERVICE ARCHITECTURE

(75) Inventor: Alla Goldner, Tel Aviv (IL)

(73) Assignee: Marvell International Ltd., Hamilton (BM)

( * ) Notice: Subject to any disclaimer, the term of this patent is extended or adjusted under 35 U.S.C. 154(b) by 330 days.

(21) Appl. No.: 12/482,545

(22) Filed: Jun. 11, 2009

Related U.S. Application Data (60) Provisional application No. 61/079,319, filed on Jul. 9, 2008.

(51) Int. Cl.
*H04M 1/00* (2006.01)
(52) U.S. Cl. .......... 455/552.1; 455/553.1; 455/436; 455/437; 455/444; 370/331; 370/329; 370/338; 370/282; 370/360
(58) Field of Classification Search .......... 455/552.1, 455/553.1, 436, 437, 444; 370/331, 329, 370/338, 282, 360, 408
See application file for complete search history.

(56) References Cited

U.S. PATENT DOCUMENTS

| | | | | |
|---|---|---|---|---|
| 2003/0235164 | A1* | 12/2003 | Rogers et al. | 370/331 |
| 2006/0240864 | A1* | 10/2006 | Sutardja | 455/552.1 |
| 2008/0037501 | A1* | 2/2008 | Ali et al. | 370/342 |
| 2008/0046963 | A1* | 2/2008 | Grayson et al. | 726/1 |
| 2008/0318580 | A1* | 12/2008 | Zhong et al. | 455/444 |
| 2011/0058520 | A1* | 3/2011 | Keller et al. | 370/328 |
| 2011/0110300 | A1* | 5/2011 | Sachs et al. | 370/328 |

OTHER PUBLICATIONS

3GPP TR 23.892 V8.0.1 (Mar. 2008); 3rd Generation Partnership Project; Technical Specification Group Services and System Aspects; IP Multimedia Subsystem (IMS) centralized services (Release 8); 167 pages.
3GPP TS 23.002 V8.2.0 (Dec. 2007); 3rd Generation Partnership Project; Technical Specification Group Services and System Aspects; Network architecture (Release 8); 62 pages.
3GPP TS 23.237 V8.0.0 (Jun. 2008); 3rd Generation Partnership Project; Technical Specification Group Services and Architecture; IP Multimedia Subsystems (IMS) Service Continuity; Stage 2 (Release 8); 40 pages.
3GPP TS 23.292 V8.0.0 (Jun. 2008); 3rd Generation Partnership Project; Technical Specification Group Services and System Aspects; IP Multimedia Subsystem (IMS) Centralized Services; Stage 2 (Release 8); 89 pages.
3GPP TS 23.401 V8.2.0 (Jun. 2008); 3rd Generation Partnership Project; Technical Specification Group Services and System Aspects; General Packet Radio Services (GPRS) enhancements for Evolved Universal Terrestrial Radio Access Network (E-UTRAN) access (Release 8); 182 pages.
3GPP TS 23.402 V8.2.0 (Jun. 2008); 3rd Generation Partnership Project; Technical Specification Group Services and System Aspects; Architecture enhancements for non-3GPP accesses (Release 8); 181 pages.
RFC 3344; IP Mobility Support for IPv4; C. Perkins, Ed., Nokia Research Center; Aug. 2002; 99 pages.
RFC 3775; Mobility Support in IPv6; D. Johnson, Rice University; C Perkins, Nokia Research Center; J. Arkko, Ericsson; Jun. 2004; 165 pages.

* cited by examiner

*Primary Examiner* — Kamran Afshar
*Assistant Examiner* — Yousef Rod (57) ABSTRACT

An access network discovery and selection (ANDSF) module includes a first transceiver that receives an service continuity signal from a service centralization and continuity application server (SCC AS). A first control module generates a preference and policy information signal based on the service continuity signal. The preference and policy information signal includes a list of access networks available for selection by a service request device (SRD). The first transceiver transmits the preference and policy information signal from the ANDSF module to the SRD.

18 Claims, 5 Drawing Sheets

FIG. 5

ACCESS NETWORK DISCOVERY AND SELECTION AND INTERNET PROTOCOL MULTIMEDIA SYSTEM SERVICE ARCHITECTURE

CROSS-REFERENCE TO RELATED APPLICATIONS

This application claims the benefit of U.S. Provisional Application No. 61/079,319, filed on Jul. 9, 2008. The disclosure of the above application is incorporated herein by reference in its entirety.

FIELD

The present disclosure relates to communication systems, and more particularly to architectures and protocols for multi-access network discovery, selection and handover.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

In the standardization of evolved $3^{rd}$ Generation Partnership Project (3GPP™) networks, 3GPP™ system architecture evolution (SAE) work is defining architectures where both evolved 3GPP™ wireless access and non-3GPP™ accesses are considered. Architectures for Internet protocol multimedia system (IMS) service continuity and centralized services are also defined. The technical specification (TS) 23.401 "3GPP™ General Packet Radio Service (GPRS) Enhancements for Long Term Evolution (LTE) Access" [1], the TS 23.402 "3GPP™ Architecture Enhancements for Non-3GPP™ Accesses" [2], the TS 23.237, "IP multimedia system (IMS) service continuity" [3], and TS 23.292 "IP multimedia system (IMS) centralized services" [4], which are incorporated herein by reference in their entirety, contain the current definitions for the architectures and related mechanisms.

Specifically, [1] describes an evolved 3GPP packet switched domain in multi-access networks for 3GPP™ accesses, [2] describes how network discovery and selection mechanisms work in multi-access networks for non-3GPP™ accesses, [3] describes requirements and procedures for delivery of IMS service continuity, and [4] describes requirements for delivery of consistent IMS services to a user (terminal) regardless of the attached access type.

SUMMARY

In one embodiment, an access network discovery and selection (ANDSF) module is provided. The ANDSF module includes a first transceiver that receives a service continuity signal from a service centralization and continuity application server (SCC AS). A first control module generates a preference and policy information signal based on the service continuity signal. The preference and policy information signal includes a list of access networks available for selection by a service request device (SRD). The first transceiver transmits the preference and policy information signal from the ANDSF module to the SRD.

In other features, the SCC AS generates the service continuity signal to maintain an active session of the SRD during at least one of a handover and a session transfer. In other features, the SCC AS generates the service continuity signal to maintain at least one of: packet switched to circuit switched service continuity using Internet protocol multimedia system centralized services; packet switched to packet switched service continuity between a $3^{rd}$ generation access network and a non-$3^{rd}$ generation access network; and packet switched to packet switched service continuity in conjunction with packet switched to circuit switched service continuity.

In still other features, the first transceiver receives the service continuity signal and the first control module generates the preference and policy information signal based on an indication of a handover of the SRD. The handover of the SRD is between a first access network and a second access network.

In yet other features, at least one of: the first transceiver receives the service continuity signal based on an indication of a session transfer of the SRD; and the first control module generates the preference and policy information signal based on an indication of a session transfer of the SRD. In other features, the service continuity signal is an internet protocol multimedia system (IMS) service continuity signal.

In other features, the first transceiver receives the service continuity signal from the SCC AS via a first interface that is between the SCC AS and the ANDSF module. The preference and policy information signal is transmitted to the SRD via a second interface that is between the ANDSF module and the SRD.

In other features, at least one of the first transceiver receives the service continuity signal and the first control module generates the preference and policy information signal based on an indication of an IP address change of the SRD. In further features, the first control module generates the preference and policy information signal when the indication is true. The first control module does not generate the preference and policy information signal when the indication is false.

In still other features, at least one of: the first transceiver receives the service continuity signal based on use of an IMS level mechanism to maintain service continuity for the SRD; and the first control module generates the preference and policy information signal based on use of an IMS level mechanism to maintain service continuity for the SRD.

In yet other features, the first control module generates the preference and policy information signal when the IMS level mechanism is used to maintain service continuity of the SRD. The first control module does not generate the preference and policy information signal when the IMS level mechanism is not used to maintain service continuity of the SRD.

In other features, the first control module generates the preference and policy information signal independent of the service continuity signal. This is based on at least one of an indication of an IP address change of the SRD and use of an IMS level mechanism to maintain service continuity of the SRD.

In other features, the service continuity signal includes at least one of load balancing information and operator access network type preferences. In other features, the preference and policy information signal includes inter-system mobility policy information and access network discovery information. In other features, the preference and policy information signal includes validity conditions.

In yet other features, the validity conditions indicate when access network discovery information is valid and locations where the access network discovery information applies to the SRD. In other features, the preference and policy information signal includes at least one of access types available to the SRD, access identifications for an access type, and an indication of whether mobility is permitted for the SRD.

In other features, a network system is provided that includes the ANDSF module and further includes the SCC AS. The SCC AS includes a second control module that transmits the service continuity signal to the ANDSF module via a second transceiver.

In other features, a network system is provided that includes the ANDSF module and further includes the SRD. The SRD includes a second transceiver that receives the preference and policy information signal. A second control module selects an access network based on the preference and policy information signal.

A method of performing network discovery and selection for an ANDSF module is provided. The method includes receiving a service continuity signal from a SCC AS. A preference and policy information signal is generated based on the service continuity signal. The preference and policy information signal is transmitted from the ANDSF module to a SRD. The preference and policy information signal includes a list of access networks available for selection by the SRD.

In other features, the service continuity signal is generated to maintain an active session of the SRD during at least one of a handover and a session transfer. In other features, the service continuity signal is generated to maintain at least one of: packet switched to circuit switched service continuity using Internet protocol multimedia system centralized services; packet switched to packet switched service continuity between a $3^{rd}$ generation access network and a non-$3^{rd}$ generation access network; and packet switched to packet switched service continuity in conjunction with packet switched to circuit switched service continuity.

In other features, the service continuity signal is received and the preference and policy information signal is generated based on an indication of a handover of the SRD. The handover of the SRD is between a first access network and a second access network.

In still other features, at least one of: the service continuity signal is received based on an indication of a session transfer of the SRD; and the preference and policy information signal is generated based on an indication of a session transfer of the SRD. In other features, the service continuity signal is an IMS service continuity signal.

In other features, the service continuity signal is received from the SCC AS via a first interface that is between the SCC AS and the ANDSF module. The preference and policy information signal is transmitted to the SRD via a second interface that is between the ANDSF module and the SRD.

In other features, at least one of the service continuity signal is received and the preference and policy information signal is generated based on an indication of an IP address change of the SRD. In other features, the preference and policy information signal is generated when the indication is true. The preference and policy information signal is not generated when the indication is false.

In yet other features, at least one of: the service continuity signal is received based on use of an IMS level mechanism to maintain service continuity for the SRD; and the preference and policy information signal is generated based on use of an IMS level mechanism to maintain service continuity for the SRD.

In other features, the preference and policy information signal is generated when the IMS level mechanism is used to maintain service continuity of the SRD. The preference and policy information signal is not generated when the IMS level mechanism is not used to maintain service continuity of the SRD.

In other features, the preference and policy information signal is generated independent of the service continuity signal based on at least one of an indication of an IP address change of the SRD and use of an IMS level mechanism to maintain service continuity of the SRD.

In other features, the service continuity signal includes at least one of load balancing information and operator access network type preferences. In other features, the preference and policy information signal includes inter-system mobility policy information and access network discovery information.

In still other features, the preference and policy information signal includes validity conditions. In other features, the validity conditions indicate when access network discovery information is valid and locations where the access network discovery information applies to the SRD. In other features, the preference and policy information signal includes at least one of access types available to the SRD, access identifications for an access type, and an indication of whether mobility is permitted for the SRD.

In other features, the service continuity signal is transmitted to the ANDSF module via a first transceiver. The service continuity signal is received from the SCC AS via a second transceiver.

In other features, the preference and policy information signal is received via a first transceiver of the SRD. An access network is selected based on the preference and policy information signal via a first control module. The service continuity signal is received from the SCC AS via a second transceiver. The preference and policy information signal is generated via a second control module based on the service continuity signal. The preference and policy information signal is transmitted from the ANDSF module to the SRD via the second transceiver.

In still other features, the systems and methods described above can be implemented by a computer program executable by one or more programmable processors to perform functions by operating on input data and generating output. The computer program can reside on a computer readable medium such as but not limited to memory, nonvolatile data storage, and/or other suitable tangible storage mediums.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

The present disclosure will become more fully understood from the detailed description and the accompanying drawings, wherein.

DESCRIPTION

The following description is provided merely as an illustrative example and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

In the following description, a service request device (SRD) may refer to user equipment (UE) and/or a mobile node. The SRD may include equipment of an end user, such as a processor, a radio interface adaptor, etc. The SRD may include a mobile network device, a personal data assistant (PDA), a computer, etc. The SRD may transmit and receive in multiple access networks during the same period or may transmit and receive in one access network at a time.

Also, in the following description, the term mobility protocol may include a local mobility protocol and/or a global mobility protocol. A local mobility protocol may refer to a communication protocol used for mobility by a SRD between access points of a network, such as a public land mobile network (PLMN). The access points are in communication with different access routers. A global mobility protocol refers to a communication protocol used for mobility by a SRD between access points of different networks. The different networks may be different PLMNs.

A mobility protocol may include a mobile Internet protocol (MIP), which may refer to a host-based or a network-based IP. Internet Engineering Task Force (IETF) RFC 3344 and IETF RFC 3775 are incorporated herein by reference in their entirety. A host-based IP may include a client mobile IP (CMIP), such as CMIPv4 and CMIPv6, or a dual stack mobile IP (DSMIP). A host-based IP is used when mobility management is handled by a SRD. A network-based IP may include a proxy MIP (PMIP), such as PMIPv4 and PMIPv6. A network-based IP may be used, for example, when mobility management is handled by a mobility management entity (MME), a gateway, or other network device on behalf of a SRD.

In addition, in the following description various networks and network devices are disclosed. Although a particular number of each network device is shown, any number of each network device may be included. For example, in a home network and or a visited network any number of wireless access gateways (WAGS), home subscriber servers (HSSs), authentication authorization and accounting (AAA) servers, etc. may be included and used to provide services to a SRD. As another example, a network may have any number of access network discovery and selection function (ANDSF) devices and service centralization and continuity (SCC) application servers from which discovery and selection information is provided to a SRD. Selection of one or more of each of the devices may be performed during communication with a SRD. Each of the network devices may be considered a remote network device relative to another network device.

Also, the terms "$3^{rd}$ generation device", "$3^{rd}$ generation network", "$3^{rd}$ generation Internet protocol (IP) access network", "$3^{rd}$ generation access", "$3^{rd}$ generation services", "$3^{rd}$ generation operators", and "$3^{rd}$ generation access device" may refer to devices, networks, operators, and accesses that are configured to operate in a 3GPP™ system, are able to obtain 3GPP™ access, include or provide 3GPP™ services, and/or include and/or are able to operate based on 3GPP™ protocols. The terms "non-$3^{rd}$ generation device", "non-$3^{rd}$ generation network", "non-$3^{rd}$ generation Internet protocol (IP) access network", "non-$3^{rd}$ generation access", "non-$3^{rd}$ generation services", "non-$3^{rd}$ generation operators", and "non-$3^{rd}$ generation access device" may refer to devices, networks, operators and accesses that are not configured to operate in a 3GPP™ system, are not able to obtain 3GPP™ access, do not include or provide 3GPP™ services, and/or do not include or operate based on 3GPP™ protocols.

A SRD may establish connectivity service in a home network where a service is initially registered. This is referred to as a non-roaming location. A SRD may also establish connectivity in a visitor network, which is referred to as a roaming location. The SRD may establish connectivity via $3^{rd}$ generation IP access network or a non-$3^{rd}$ generation IP access network. In a non-roaming scenario or roaming scenario, a mobile operator (e.g. T-mobile™ and AT&T™) of respectively a home PLMN (hPLMN) and a visited PLMN (vPLMN) provides services to the SRD.

A SRD may be a circuit switched (CS) and/or a packet switched (PS) enhanced device. The term enhanced refers to the ability of a device to support communication in a particular domain and/or to support certain services and corresponding protocols. A SRD may receive IP multimedia subsystem (IMS) services. IMS services include IP multimedia services, such as audio, video, text, chat, etc and supplemental services, which are provided over a PS domain. The supplemental services may include call forwarding, barring, hold, resume, 3-way calling, etc. Multiple SRDs may be associated with a single user or account and may obtain access in a residential or non-residential setting. The residential and non-residential settings may have limited coverage.

The following embodiments are applicable to a universal mobile telecommunication system (UMTS), a global system for mobile communications (GSM), a code division multiple access (CDMA)-2000 system, a time division-synchronous code division multiple access (TD-SCDMA) system, a wireless local area network (WLAN), a Wi-Fi™ system, a WiMAX system, a 3GPP™ system, a long term evolution (LTE) system, etc. and associated standards of communication. The following embodiments may also comply with 3GPP™ technical specifications and reports, some of which are stated herein and incorporated by reference in their entirety.

Figure 1:
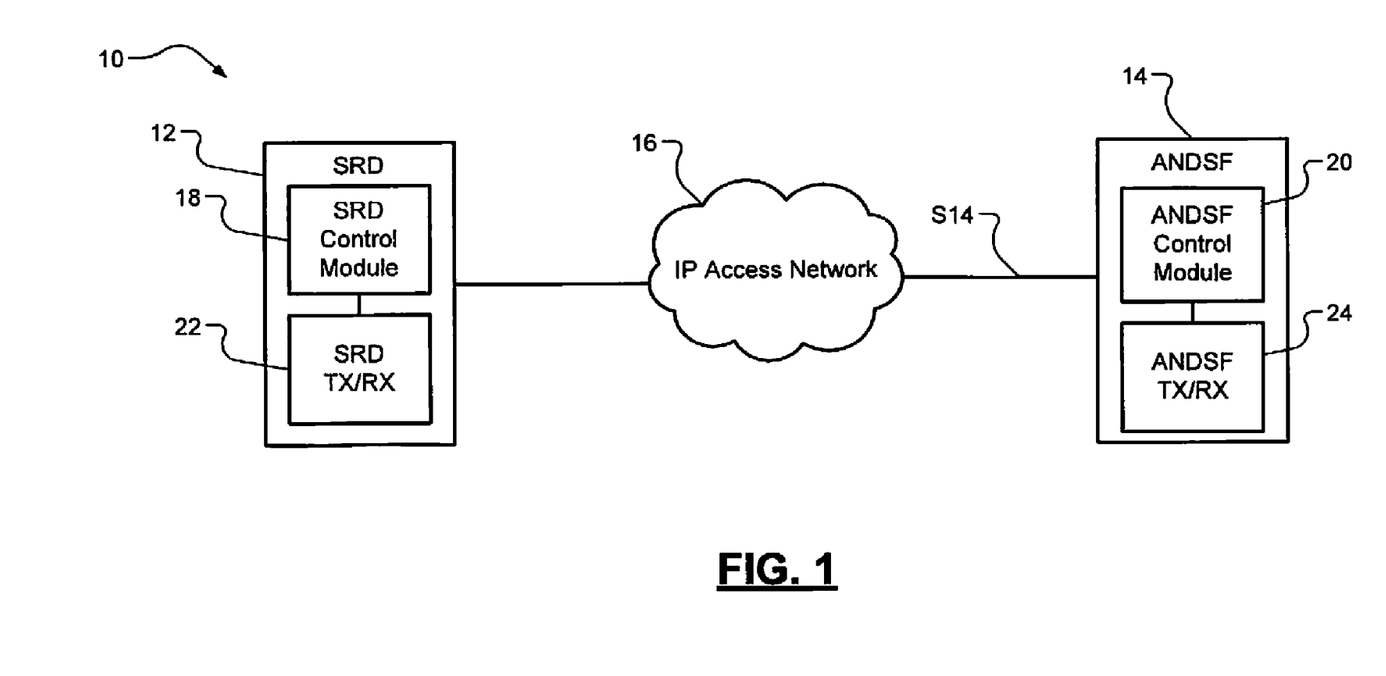
FIG. 1 is a functional block diagram of an evolved packet system (EPS) network that has an access network discovery and selection function (ANDSF) architecture.

In FIG. 1, an evolved packet system (EPS) network 10 that has an access network discovery and selection function (ANDSF) architecture is shown. The EPS network 10 includes a SRD 12 that is in communication with an ANDSF module 14 (may be referred to as an ANDSF entity or device) via an Internet protocol (IP) access network 16. The IP access network 16 may be a $3^{rd}$ generation network or a trusted or untrusted non-$3^{rd}$ generation network and may include multiple access networks (i.e., accesses) for the SRD 12. The SRD 12 and the ANDSF module 14 respectively include a SRD control module 18 and an ANDSF control module 20 and respective transceivers 22, 24.

The SRD 12 may operate in an active mode or in an idle mode. During the active mode the SRD 12 may be connected to the IP access network 16 and be involved in an active (live) session with another SRD or terminal ($3^{rd}$ party). During the idle mode the SRD 12 may be in communication with the IP access network 16, but may not be involved in an active session with a $3^{rd}$ party. The SRD 12 may perform multi-access network discovery and selection during the active and/or idle modes. This includes determining N available accesses and selecting one of the N available accesses for the reception of IP services. N may be an integer greater than or equal to 1. The SRD may be involved in a handover to a different radio access technology (access network) during the idle mode.

The SRD 12 may perform multi-access network discovery and selection, as a single-radio terminal or as a multiple-radio terminal. In other words, the SRD 12 may include one or more radios and perform multi-access network discovery and selection in association with each of the radios. As a multiple-radio terminal, the SRD 12 may include a first radio for access to a first network and a second radio for access to a second network.

The EPS network 10 may provide the SRD 12 with assistance data/policies regarding available accesses via the ANDSF module 14 during access network discovery and selection. This allows the SRD 12 to scan for and select available accesses. The SRD 12 may transmit an access request to the IP access network 16 and/or the ANDSF module for the retrieval of assistance data/policies. The assistance data/policies may identify certain accesses that the SRD 12 may use, for example, in an emergency and/or based on network load balancing, network mobility, operator preferences, roaming agreements, etc. The EPS network 10 allows a home operator or a visited operator via the ANDSF module 14 to influence the access that the SRD 12 selects. The ANDSF module 12 may limit the available accesses to certain accesses, for example, that the SRD 12 is able to select when in an active mode (e.g., during a handover) or that the SRD 12 is able to re-select when in idle mode. A handover may refer to a transfer of a user's connection between radio channels and/or between radio access networks.

The ANDSF module 14 includes data management and control functionality to provide network discovery and selection assistance data as per operators' policy(ies). The ANDSF module 14 may initiate data transfer to the SRD 12 based on network triggers and respond to requests from the SRD. ANDSF capabilities may be used when access-network level solutions are not sufficient for the SRD 12 to perform network discovery and selection of non-3GPP accesses according to operator policies without assistance.

The ANDSF module 14 may provide inter-system mobility policy information and access network discovery information. The inter-system mobility policy information is a set of operator-defined rules and preferences that affect inter-system mobility decisions taken by the SRD 12. The SRD 12 uses the inter-system mobility policy information to decide when inter-system mobility is allowed, restricted and/or limited. For example only, inter-system mobility policy information may indicate that an inter-system handover from an evolved universal terrestrial radio access network (E-UTRAN) access to a WLAN access is not permitted.

The SRD 12 may also use the inter-system mobility policy information to select an access technology type or access network to be used to access an evolved packet core (EPC) (not shown). The EPC is a core network architecture of 3GPP™ for LTE wireless communication. The inter-system mobility policy information may identify which access technology type or which specific access network is preferred by an Operator for EPC access. The inter-system mobility policy information may indicate when a specific access technology type is preferred to another. A first access type may be preferred over a second access type, for example, a WiMAX access in certain situations may be preferred over a WLAN access and vice versa. The inter-system mobility policy information may also specify an access network identifier that is preferred by an Operator to another (e.g., WLAN service set identifier (SSID)-1 may be preferred to WLAN SSID-2 in certain situations). The access network identifier may distinguish between networks of the same type.

The inter-system mobility policy information may be provisioned in the SRD 12 and may be updated by the ANDSF module. The ANDSF module may update the inter-system mobility policy information based on network triggers and/or after receiving a request for network discovery and selection information from the SRD 12.

The inter-system mobility policy information also identifies when inter-system mobility is allowed or restricted. Information regarding when inter-system mobility is restricted from one access technology type to another (e.g., handover from a WiMAX access to a WLAN access is restricted) may be included. Information regarding the restriction of inter-system mobility when certain conditions are met may be included. The inter-system mobility policy information may also include validity conditions, such as conditions that indicate when a policy is valid. The validity conditions may include, for example, a duration of time, a location area, etc. The validity conditions may also indicate when the SRD 12 may request new policies.

Upon a request from the SRD 12, the ANDSF module 14 may provide the access network discovery information. The access network discovery information may include a list of access networks available in the vicinity of the SRD 12 for the access technology types requested by the SRD 12. The ANDSF module 14 provides information for access networks that are available to the SRD including the access technology type (e.g., WLAN, Wi-Fi™, WiMAX, etc.) and a radio access network (RAN) identifier (e.g., the SSID of a WLAN). The ANDSF module 14 may also provide other technology or access type specific information, such as carrier frequency information.

The access network discovery information may also include validity conditions, such as conditions that indicate when the provided access network discovery information is valid. The conditions may include location information indicating the locations in which the access network discovery information applies. The SRD 12 may retain and use the access network discovery information provided by the ANDSF module 14 until new/updated information is received or accessed. The SRD 12 selects an available access network for inter-system mobility based on received/provisioned inter-system mobility policies.

The ANDSF module 14 communicates with the SRD 12 over the IP access network 16 using an S14 reference point or interface. The S14 interface may be located between the SRD 12 and the ANDSF module 14 for direct queries. The S14 interface may refer to a direct link between the SRD 12 and the ANDSF module 14 or may include network entities, access points, routers, etc. between the SRD 12 and the ANDSF module 14. The SRD 12 may PULL information from the ANDSF module 14 via the S14 interface and/or the ANDSF module 14 may PUSH information to the SRD via the S14 interface. The S14 interface enables dynamic provisioning of information to the SRD 12 for network discovery and selection procedures related to, for example, non-3GPP accesses. A protocol assumption may be that the S14 interface is realized above an IP level.

The inter-system mobility policies available to the ANDSF module 14 and/or provided to the SRD 12 may be organized in a hierarchy. For example, policies may be ordered based on priority. The policy with the highest priority may be applied. The inter-system mobility policies provided to the SRD 12 may have different scopes. A generic inter-system mobility policy may have unrestricted scope. In contrast, a SRD activity level specific inter-system mobility policy may apply to the SRD depending on the activity level of the SRD 12. For example, a first inter-system mobility policy may apply to the SRD 12 while the SRD 12 is in the active mode. A second inter-system mobility policy or no inter-system mobility policy may apply to the SRD 12 while the SRD 12 is in the idle mode.

For further description of an ANDSF module (i.e., ANDSF) see, for example, the TS 23.402 "3GPP™ Architecture Enhancements for Non-3GPP™ Accesses", which is incorporated herein by reference in its entirety. The TS 23.402 provides example definitions of how network discovery and selection mechanisms may be used in multi-access networks. The mechanisms and interfaces are defined for communication between a UE and an ANDSF module.

Figure 2:
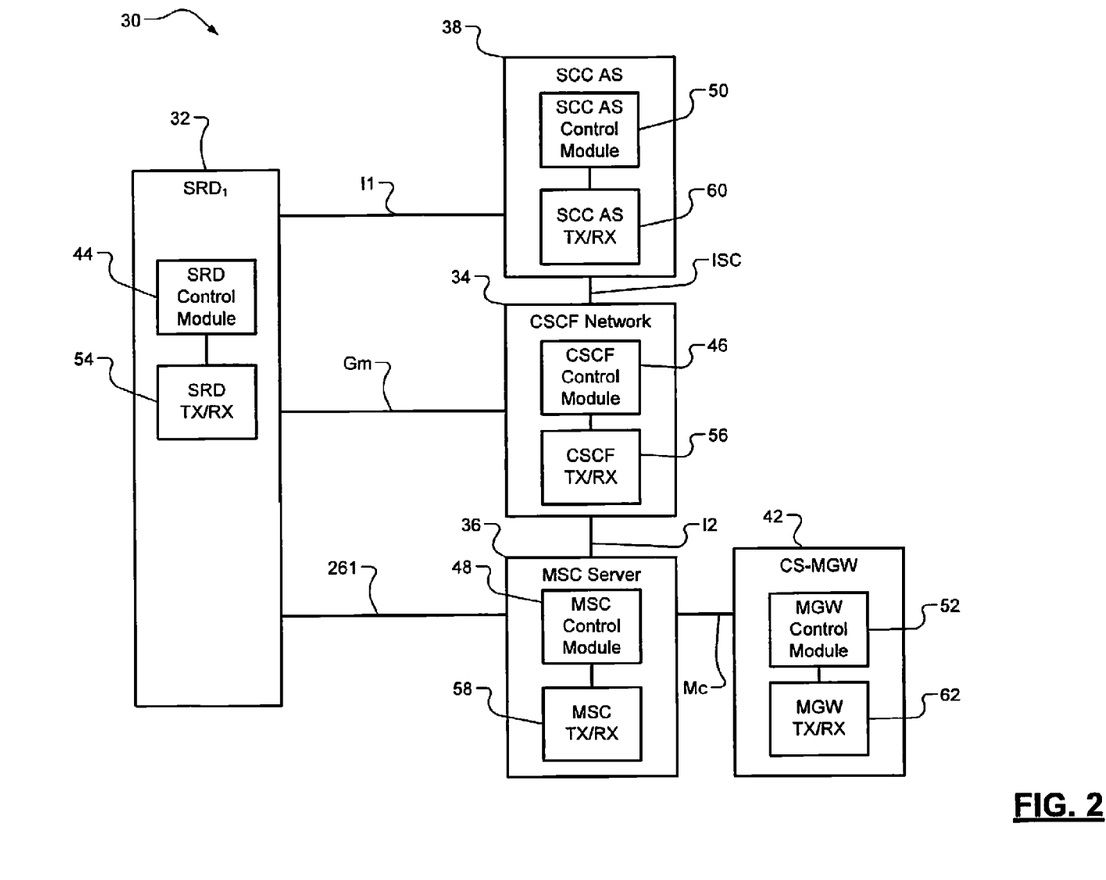
FIG. 2 is a functional block diagram of an IMS centralized services (ICS) network system.

In FIG. 2, an IMS centralized services (ICS) network system 30 is shown. The ICS network system 30 includes a SRD 32 that may access IMS services via a call state control function (CSCF) network 34 and a mobile switch center (MSC) server 36. The access may be based on information from and/or communication with a service centralization and continuity application server (SCC AS) 38. The MSC server 36 is enhanced for IMS sessions based on a CS access interface 40. The MSC server 36 may communicate with a CS-MGW 42 via interface Mc. The CS-MGW 42 may be responsible for media processing for calls to or from a CS device and/or network. The SRD 32, the CSCF network 34, the MSC server 36, the SCC AS 38 and the CS-MGW 42 may have respectively a SRD control module 44, a CSCF control module 46, a MSC control module 48, a SCC AS control module 50 and a CS-MGW control module 52 and respective transceivers 54, 56, 58, 60, 62.

The architecture of the ICS network system 30, as shown allows for a non-ICS enhanced SRD to access IMS services. The SRD 32 may be CS or PS enhanced. IMS sessions that correspond with CS sessions include data signaling via an interface Gm between the SRD 32 and the CSCF network 34 and control signaling via the CS access. The MSC server 36 may communicate with the CSCF network 34 via interface 12. IMS sessions that correspond with PS sessions include control and data signaling via interface I1 between the SRD 32 and the SCC AS 38. The SCC AS 38 communicates with the CSCF network 34 via an interface ISC. The SCC AS 38 provides functions specific to IMS service centralization and continuity. The MSC server 36 is enhanced for ICS.

The CSCF network 34 may include one or more CSCFs, which are SIP servers that are a point of IMS contact. The CSCF network 34 and/or one of the CSCF entities may include an ICS server (not shown). The CSCF network 34 provides endpoints for registration and routing for SIP messages and enables the messages to be routed to the correct application servers. The CSCF network 34 maintains a quality of service (QoS) level.

To provide consistency when accessing services using CS and PS enhanced devices, IMS centralized services (ICS) may be provided to the SRD. Telephony and supplemental services are provided to the SRD through ICS. The SRD may request various real-time and non-real-time services, such as Web browsing, voice over Internet phone (VoIP), electronic mail (email), and real-time IP multimedia, as well as conversational and streaming services. The SRD may be ICS or non-ICS enhanced. The SRD may be VCC or non-VCC based. A non-ICS enhanced SRD refers to a SRD that supports a domain other than a PS and/or IMS domain. A SRD that is non-VCC based refers to a SRD that does not support VCC.

ICS is one application of an IMS and refers to the use of an IMS application server that manages SRD sessions of a user that include the reception of IMS services. Each SRD of a user may be active and receive services during the same time period. The reception of ICS services may be provided from an ICS application server via the MSC server 36.

The MSC server 36 is ICS enhanced and may communicate with an ICS application server on behalf of the SRD 32 to provide telephony and supplemental services. ICS is further described in 3GPP™ technical report (TR) 23.892 "IP Multimedia Subsystem (IMS) centralized services" and in 3GPP™ technical specification (TS) 23.292 "IP Multimedia Subsystem (IMS) centralized services", which are incorporated herein by reference in their entirety.

The MSC server 36 may be enhanced for the support of ICS according to 3GPP™ TS 23.292. The MSC server 36 may comply with 3GPP™ TS 23.002 "Network Architecture", which is incorporated herein by reference in its entirety. The MSC server 36 may process user-network signaling for interworking with a 3GPP™ session initiated protocol (SIP) and vice versa. The MSC server 36 controls media gateway (MGW) functions as described in 3GPP™ TS 23.002 to enable interworking between CS access and real time protocol (RTP) bearers. A bearer refers to a set of network resources and data transport functions that are used to delivery user traffic between two network entities. A bearer may include a logical or a physical connection, may define a specific route, and may include quality of service parameters. The MSC server 36 may perform the interworking between H.245 and SIP/session description protocol (SDP) to support multimedia calls through ICS.

H.245 is a control signaling protocol in a H.323 multimedia communication architecture. H.245 is used for the exchange of end-to-end H.245 messages between communicating H.323 endpoints/terminals. The H.245 control messages are carried over H.245 control channels. The H.245 control channel is a logical channel 0 and is permanently open, unlike media channels. The messages carried include messages to exchange capabilities of terminals and to open and close logical channels. After a connection has been set up via a call signaling procedure, a H.245 call control protocol is used to resolve a call media type and to establish a media flow before a call can be established. H.245 is also used to manage the call after the call has been established.

The MSC server 36 presents 3GPP™ session initiated protocol (SIP) user agent (UA) behavior on behalf of a SRD toward an IMS. Use of direct SIP signaling between the MSC server 36 and the CSCF network 34 enables capability to provide telephony services exclusively from the IMS. As use of the direct SIP signaling between the MSC server 36 and the CSCF network 34 enables the capability to provide telephony services exclusively from the IMS, telephony and supplemental services are provided via the IMS.

The SCC AS 38 provides IMS-based mechanisms for enabling service continuity of multimedia sessions. Service continuity may refer to a handover between two wireless networks without user intervention and with minimal service disruptions (i.e., packet loss, etc.). For IMS service continuity, the SCC AS 38 implements session transfer and is in charge of distributing operator policies. A session transfer may refer to a transfer at an IMS level of one or more of the session signalling paths and/or associated media flow paths of an ongoing IMS session while maintaining service continuity. A session transfer incorporates access transfer and/or inter-UE (SRD) transfer. The SCC AS 38 uses the ISC interface for execution of a session transfer. The SCC AS 38 may perform various tasks for the enablement and execution of session transfers between different access networks.

For example, the SCC AS 38 may analyze a set of data or information that is used for a session transfer and then decide which session transfer technique to execute. The SCC AS 38 may decide based on the analysis of session continuity related input factors whether to update a provisioned operator policy for session transfer. The SCC AS 38 may also generate and update operator session transfer policies. The policies may be updated by sending the policies to the SRD 32 including any priorities of or between the policies and user preferences. The user preferences may be preferences that are used to initiate session transfer procedures for ongoing sessions.

For further description of an example ICS network or corresponding entities see the TS 23.237, "IP multimedia system (IMS) service continuity" and the TS 23.292 "IP multimedia system (IMS) centralized services", which are incorporated herein by reference in their entirety.

The TS 23.237 provide IMS protocols, which may be used by the ICS network system 30 for service continuity between the SRD 32 and an access network. The service continuity may be maintained during an active session of the SRD 32 based on operator policies. The TS 23.237 describes ICS service policies and policy transfer functionality that may be performed by the ICS network system 30. The policy transfer functionality may be used for the transfer of policy information from the SCC AS 38 to the SRD 32 when the mobility techniques associated with the EPS network 10 of FIG. 1 and/or described by the TS 23.402 cannot be used.

The ICS network system 30 may be used to support service continuity when the mobility techniques described in the TS 23.401 and in the TS 23.402 can not be used to maintain service continuity and there is a need for IMS level mechanisms. Mobility techniques described with respect to FIG. 1 and/or in the TS 23.401 and in the TS 23.402 may be referred to as "normal" or non-IMS level mobility mechanisms. Normal mobility mechanisms may not include a change in IP address of a SRD during a handover between networks. This may occur, for example, when there is a transfer between similar PS networks or between CS networks (in which case an IP address may not be used).

IMS level mobility mechanisms may be needed in certain mobility situations. IMS level mobility mechanisms may be used in situations when an IP address of a SRD is to change during a handover between networks or when a serving proxy-CSCF (P-CSCF) changes. IMS level mobility mechanisms may also be used in the following three situations.

A first mobility situation that IMS level mechanisms may be used is when a SRD moves from a PS network to a CS network, which is described in TS 23.292. In the first mobility situation PS-to-CS service continuity is maintained. A second mobility situation that IMS level mechanisms may be used is when a SRD moves between two PS networks, where the first PS network is a 3GPP™ network and the second PS network is a non-3GPP™ network. In the second mobility situation PS-to-PS service continuity is provided.

A third mobility situation that IMS level mechanisms may be used is when a SRD moves between networks and services to the SRD are bifurcated after the corresponding handover. For example, before the handover a first service (or first set of services) and a second service (second set of services) are provided by a first PS network. After the handover, the first service (or the first set of services) is provided by a second PS network and the second service (or the second set of services) is provided by a CS network. In this situation the IMS level mechanisms provide PS-to-PS service continuity in conjunction with PS-to-CS service continuity.

Bifurcation of services may occur when a SRD, for example, moves out of range of a corresponding access point. A handoff may occur between the access point and a cellular network, such as a macro-cellular network. Session continuity is needed to provide handoff functions, such as between PS and CS domains. Also, a bifurcation of services can exist before and/or as a result of the handoff. For example, voice call services may be provided in the CS domain, whereas supplemental services may be provided in the PS domain.

From FIGS. 1 and 2 it can be seen that two different architectures with different mechanisms and functionality may be used within a network by a SRD for network discovery and selection and service continuity. The first architecture may be used when service continuity can be achieved with an IMS and a second architecture may be used when service continuity can be used without an IMS. For example, mobility mechanisms provided by the ANDSF module 14 of FIG. 1 may be used when service continuity can be achieved without an IMS and mobility mechanisms provided by the SCC AS 38 of FIG. 2 may be used when service continuity can be achieved with an IMS.

The following embodiments provide a common mechanism that may be performed using a single entity within a network for network discovery and selection when service continuity can be achieved with and/or without an IMS. The common mechanism may be used in situations when normal mobility mechanisms are used and IMS mechanisms are not required and in situations when normal mobility mechanisms are not sufficient and IMS mechanisms are required.

The following described embodiments include multi-access network discovery and selection by a SRD 32 when both 3GPP and non-3GPP accesses are available and/or when multiple non-3GPP accesses are available. This includes situations when normal mobility mechanisms are used for handovers and situations when IMS service continuity mechanisms are used for handovers/session transfers. The network discovery and selection may be performed when a SRD is in an active mode or in an idle mode. An operator provides an operator policy for the best "to be attached" network and assists the SRD (i.e., multimode terminal) with that policy based on various parameters, such as charging policies, network load sharing, etc. The SRD may be assisted with the operator policy both when in an idle mode and during an active session. This may start a handover/roving process.

Figure 3:
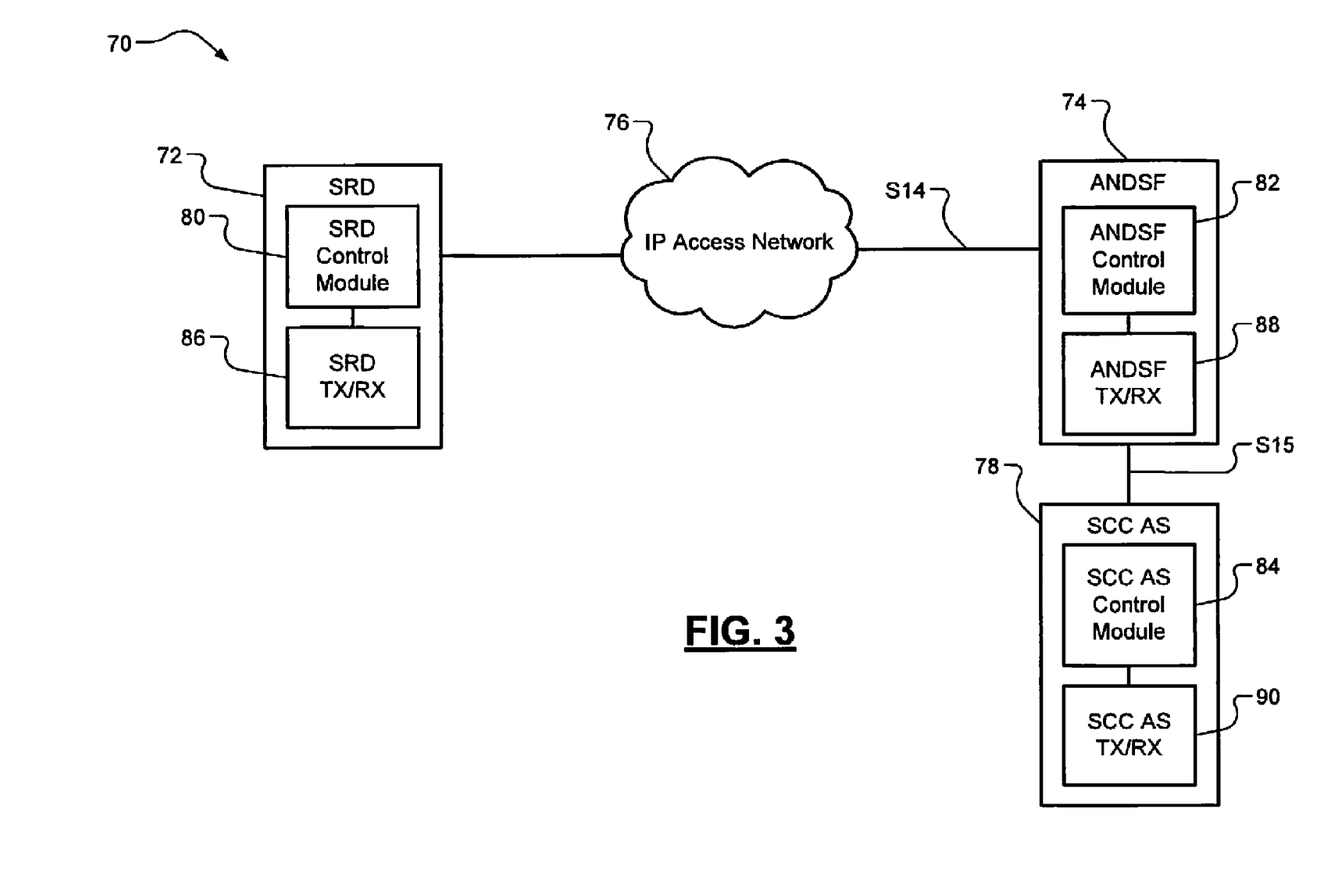
FIG. 3 is a functional block diagram of an EPS network that incorporates an ANDSF architecture and provides IMS service continuity in accordance with an embodiment of the present disclosure.

In FIG. 3, an EPS network 70 that incorporates an ANDSF architecture and provides IMS service continuity is shown. The EPS network 70 includes a SRD 72 that is in communication with an ANDSF module 74 (may be referred to as an ANDSF entity or device) via a S14 interface and an Internet protocol (IP) access network 76. The IP access network 76 may include home public land mobile networks (HPLMNs) and/or visited public land mobile networks (VPLMNs)

through which access is provided. A SCC AS 78 provides SCC AS policies via a service continuity signal to the ANDSF module 74 using a S15 interface. The S15 interface may refer to a direct link between the SCC AS 78 and the ANDSF module 74 or may include network entities, access points, routers, etc. between the SCC AS 78 and the ANDSF module 74.

The SRD 72, the ANDSF module 74, and the SCC AS 78 respectively include a SRD control module 80, an ANDSF control module 82 and a SCC AS control module 84 and respective transceivers 86, 88, 90. The IP access network 76 may be a $3^{rd}$ generation network or a trusted or untrusted non-$3^{rd}$ generation network and may include multiple accesses for the SRD 72. The ANDSF module 74 provides operator and service continuity policies to the SRD 72 for network discovery and selection for both normal mobility mechanisms and for IMS level mobility mechanisms.

The SRD 72 may perform multi-access network discovery and selection during idle and/or active modes. The SRD 72 may perform multi-access network discovery and selection, as a single-radio terminal or as a multiple-radio terminal. The SRD control module 80 may select an access network based on a network policy and preference signal received from the ANDSF module 74. The network policy and preference signal may identify available access networks and operator preferences and policies with regard to access network selection.

The SRD 72 may transmit an access request signal to the IP access network 76 and/or the ANDSF module for the retrieval of assistance data/policies for network selection. The assistance data/policies may identify certain accesses that the SRD 72 may use, for example, in an emergency or based on network load balancing, network mobility, operator preferences, roaming agreements, etc. The ANDSF module 74 may limit the available accesses to certain accesses, for example, that the SRD 72 is able to select when in an active mode (e.g., during a handover) or that the SRD 72 is able to re-select when in idle and/or active modes.

The ANDSF module 74 may perform the functions performed by the ANDSF module 14 of FIG. 1 and additional functions associated with IMS service continuity. The ANDSF module 74 may collect policies and preferences from different resources or entities, such as from the SCC AS 78 and generate a preference and policy information signal based thereon. The S15 interface may be used for the transfer of SCC AS related information and policies to the ANDSF module 74. The SCC AS related information and policies or a portion thereof may be transferred to the SRD 72 via the ANDSF module 74 and may not be transferred from the SCC AS 78 to the SRD 72 directly. The ANDSF module 74 may decide which of the SCC AS policies to transfer, which SCC AS policies to modify, and/or priorities of the SCC AS policies. The priorities may be ranked relative to other operator policies available to the ANDSF module 74.

The ANDSF module 74 may provide inter-system mobility policy information and access network discovery information to the SRD 72. The SRD uses the inter-system mobility policy information to decide when inter-system mobility is permitted or restricted. The ANDSF module 74 includes data management and control functionality to provide network discovery and selection assistance data as per operators' policy(ies). The management and control functionality may be based on SCC AS policy information received from the SCC AS 78. The ANDSF module 74 may initiate data transfer to the SRD 72, based on network triggers, and respond to requests from the SRD 72. ANDSF capabilities may be used when access-network level solutions are not sufficient for the SRD 72 to perform network discovery and selection of non-3GPP accesses according to operator policies without assistance.

The ANDSF module 74 may perform IMS session transfer decisions based on the SCC policies. The IMS transfer decisions may be transmitted to the SRD 72 from the ANDSF module 74 over the S14 interface instead of from the SCC AS 78. The SRD 72 starts a session transfer procedure for IMS service continuity based on the IMS transfer decisions. For session transfer triggering, direct communication between the SCC AS 78 and the SRD 72 may not be used. Session transfer triggering may be performed via the ANDSF module 74.

In operation, the ANDSF module 74 receives ICS preference and policy information from the SCC AS 78. The ANDSF module 74 performs a session transfer or handover based on the information received from the SCC AS 78. The ANDSF module 74 may inform the SRD 72 when a handover is to be performed by transmitting a session transfer signal to the SRD 72. The SRD 72 may then start a session transfer procedure by initiating a predefined message sequence with the ANDSF module 74 and/or with the SCC AS 78.

The IP access network 76 (e.g., a HPLMN and/or a VPLMN) may provide the SRD 72 with access network information pertaining to locally supported 3GPP™ and non-3GPP™ access networks, in a resource efficient and secure manner. The access network information may be provided to prevent unnecessary background scanning by the SRD 72 and to facilitate service continuity by the SRD 72. This facilitates changes and provides service continuity between 3GPP™ and non-3GPP™ access systems and vice versa. The information may be restricted to the access network technologies that can be used by the SRD 72. The SRD 72 may receive information from a non-3GPP™ access network indicating which PLMN or PLMNs the non-3GPP™ access network provides access to during discovery of non-3GPP™ accesses by the SRD 72. A PLMN that provides the non-3GPP™ access may indicate local availability of 3GPP™ access to the SRD 72 in a secure manner when the SRD 72 receives service via the non-3GPP™ access, subject to the capabilities of the non-3GPP™ access.

Figure 4:
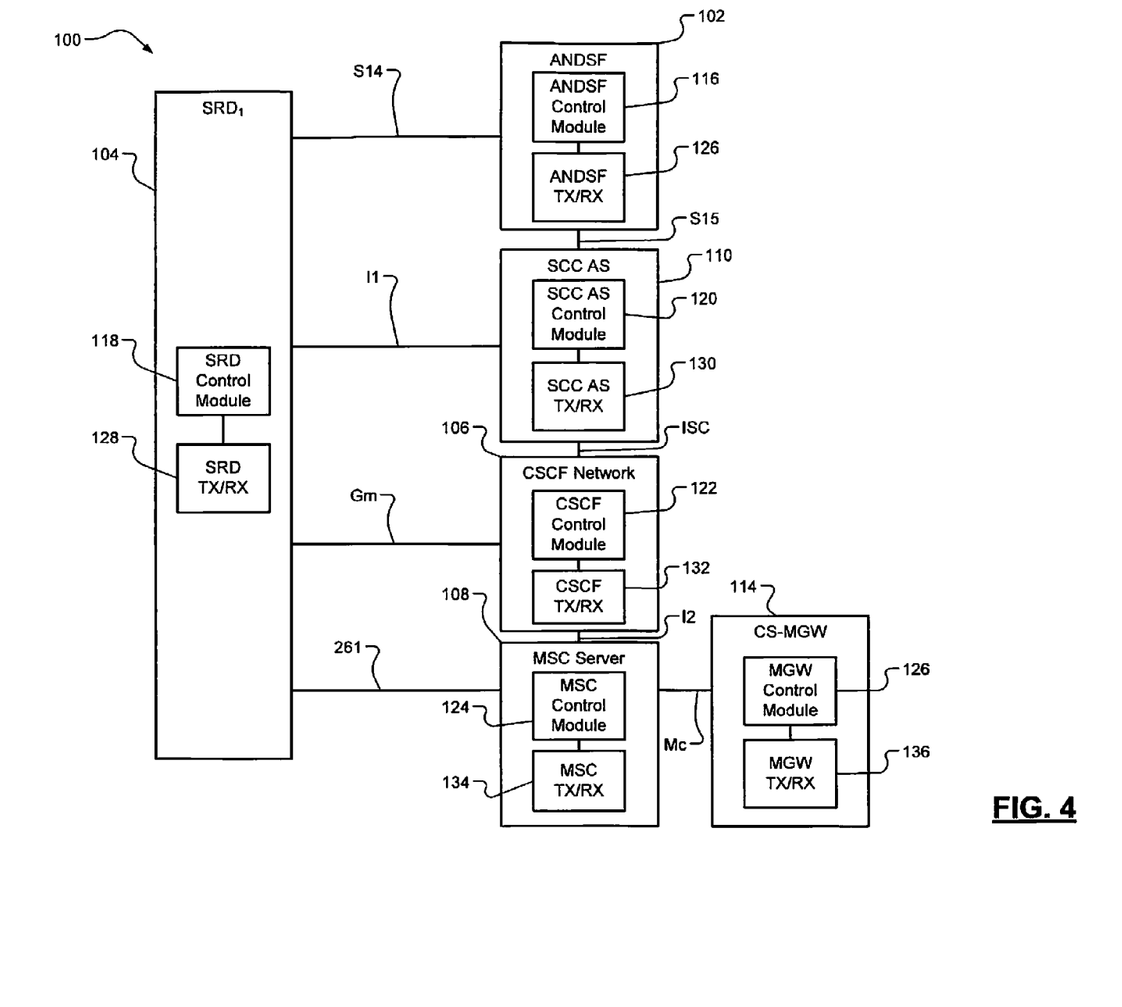
FIG. 4 is a functional block diagram of an ICS network system that incorporates an ANDSF module in accordance with an embodiment of the present disclosure.

In FIG. 4, an ICS network system 100 that incorporates an ANDSF module 102 (may be referred to as an ANDSF entity or device) is shown. The ICS network system 100 includes a SRD 104 that may access IMS services via a CSCF network 106 and a MSC server 108 according to information from and/or communication with the ANDSF module 102. The IMS services may be provided based on SCC related information and policies received by the ANSDF module 102 from a SCC AS 110. The MSC server 108 is enhanced for IMS sessions based on a CS access interface 112. The MSC server 108 may communicate with a CS-MGW 114 via interface Mc.

The SRD 104 and ANDSF module 102 may perform functions performed by the SRD 72 and ANDSF module 74 of FIG. 3. The ANDSF module 102 provides functions specific to IMS service centralization and continuity based on SCC information received by the SCC AS 110. The SCC AS 110 may perform functions performed by the SCC AS 78 of FIG. 3 in addition to communicating with the SRD 104 via the I1 interface. The I1 interface may not be used for network discovery and selection and may not be used for IMS service continuity. The CSCF network 106, the MSC server 108, and the CS-MGW 114 may perform the functions of the CSCF network 34, the MSC server 36 and the CS-MGW 42 of FIG. 2. The ANDSF module 102, the SRD 104, the SCC AS 110, the CSCF network 106, the MSC server 108, and the CS-MGW 114 may have respectively a ANSDF control module 116, a SRD control module 118, a SCC AS control module 120, a CSCF control module 122, a MSC control module 124 and a CS-MGW control module 126 and respective transceivers 126, 128, 130, 132, 134, 136.

IMS sessions that correspond with CS sessions include data signaling via an interface Gm between the SRD 104 and the CSCF network 106 and control signaling via the CS access interface 112. The MSC server 108 may communicate with the CSCF network 106 via interface 12. IMS sessions that correspond with PS sessions include control and data signaling via interface I1 between the SRD 104 and the SCC AS 110. The SCC AS 110 communicates with the CSCF network 106 via an interface ISC. The MSC server 108 is enhanced for ICS. The SCC AS uses the ISC interface for execution of a session transfer.

For example, the ANDSF module 102 may analyze a set of data or information that is used for a session transfer and then decide which session transfer technique to execute out of M transfer techniques. M is an integer greater than or equal to 1. The ANDSF module 102 may decide based on the analysis of session continuity related input factors whether to update a provisioned operator policy for session transfer. The ANDSF module 102 may also generate and update operator session transfer policies. The policies may be updated by sending the policies to the SRD 104 including any priorities of or between the policies and user preferences via the S14 interface. The policies may not be directly sent from the SCC AS 110 to the SRD 104. The user preferences may be preferences that are used to initiate session transfer procedures for ongoing sessions.

Figure 5:
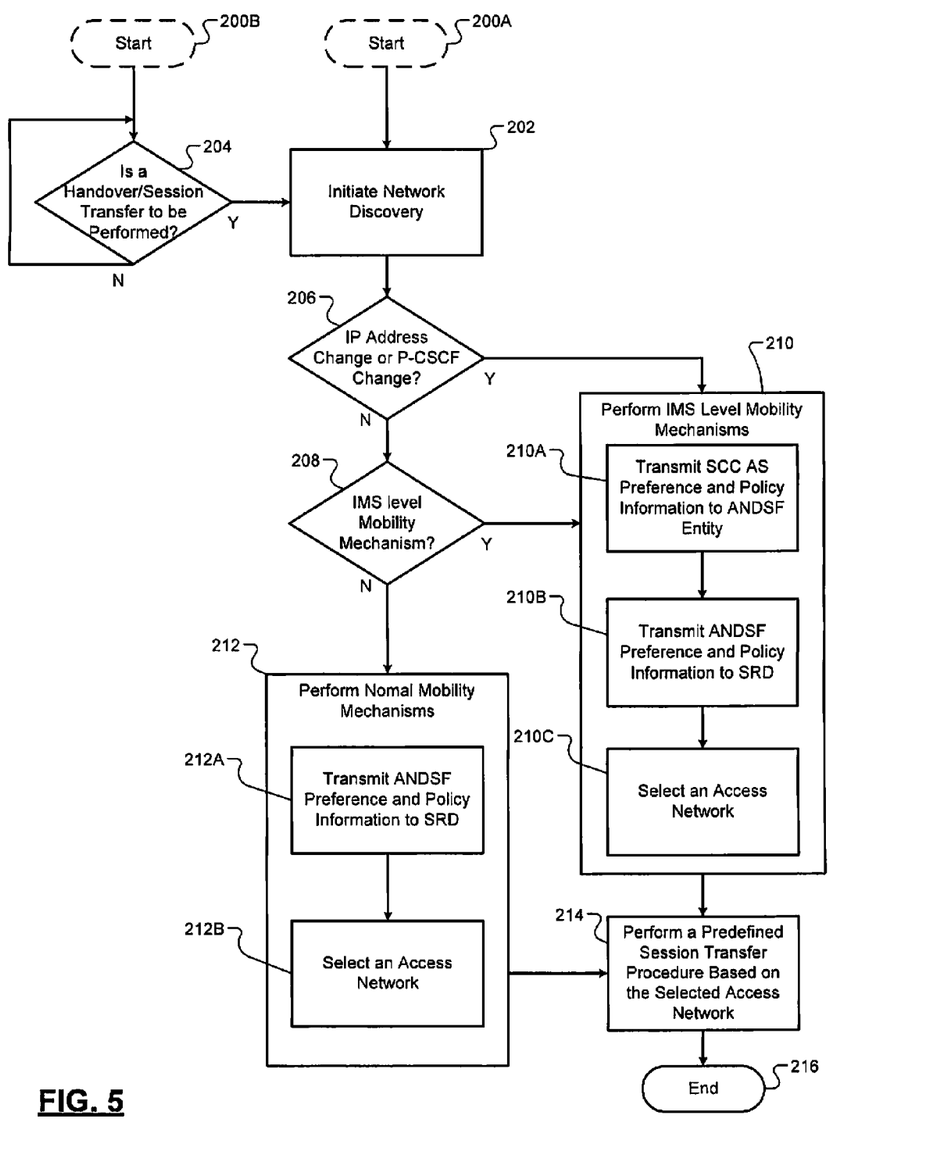
FIG. 5 illustrates a method of performing network discovery and selection while providing IMS service continuity in accordance with an embodiment of the present disclosure.

In FIG. 5, a method of performing network discovery and selection while providing IMS service continuity is shown. Although the following steps are described primarily with respect to the embodiments of FIGS. 3 and 4, the steps may be applied to other embodiments of the present disclosure. In the following steps, tasks, protocols and control are described that may be performed by respective control modules and transceivers of a SRD, an ANDSF module, and a SCC AS.

The method may begin at 200A or 200B. 200A may be associated with the initiating of the method by the SRD when in an idle mode. This may include the SRD deciding to attach to an access network and receive services. 200B may be associated with the initiating of the method by the SRD or the ANDSF module based on a decision to perform a handover/session transfer. The SRD may request a handover and/or a session transfer via a handover or session transfer request signal or the ANDSF module may indicate to the SRD that a handover/session transfer is to be performed via a handover or session transfer alert signal. The SRD may be in an active or idle mode when a handover/session transfer is to be performed. Step 202 may follow step 200A. Step 204 may follow step 200B.

In step 202, access network discovery is initiated by either the SRD or the ANDSF module. The SRD may generate and transmit an access network request signal to the ANDSF module requesting available access networks and operator preferences and policies when the access network discovery is initiated by the SRD. The access network request signal may identify access technology types that the SRD is capable of using. The ANDSF module may request access technology types preferred by the SRD via transmission of an access technology type signal to the SRD.

In step 204, the SRD and/or the ANDSF module determine whether a handover and/or a session transfer is to be performed. Step 202 may be performed when a handover and/or a session transfer is to be performed, otherwise control may return to step 200B.

In step 206, the SRD and/or the ANDSF module may determine whether an IP address change is to be executed with respect to the SRD due to the handover, a session transfer, and/or a serving P-CSCF changes. For example, when the SRD moves from a first access network to a second access network, a new IP address may be assigned to the SRD. As another example, when reception of the SRD for a current session is degraded or does not meet a quality of service level, a handover between networks may occur that involves an IP address change. When an IP address change is not to occur step 208 may be performed, otherwise step 210 may be performed.

In step 208, the ANDSF module may determine whether IMS level mobility mechanisms are to be used to maintain IMS service continuity. IMS level mobility mechanisms may be used when the handover/session transfer is a PS-to-CS transfer, a PS-to-PS transfer, and or a non-bifurcated-to-bifurcated transfer. The PS-to-PS transfer may be, for example, from a $3^{rd}$ generation access network to a non-$3^{rd}$ generation access network. The non-bifurcated-to-bifurcated transfer may be, for example, from a first PS network to both a second PS network and a CS network. For example only, video and voice services may be provided by the first PS network before the handover, and video services may be provided by the second PS network and voice services may be provided by the CS network after the handover. When IMS level mobility mechanisms are to be used, step 210 may be performed, otherwise step 212 may be performed.

In step 210, IMS level mobility mechanisms are used to maintain service continuity. In step 210A, the ANDSF module receives a SCC AS (first) preference and policy information signal from a SCC AS. The first preference and policy information signal may be referred to as an IMS service continuity signal and include SCC AS preference and policy information described above. The first preference and policy information signal may include IMS service continuity information, load balancing information, operator access network (technology) type preferences, etc. The first preference and policy information signal may be transmitted to the ANDSF module via a S15 interface.

In step 210B, the ANDSF module generates a second preference and policy information signal based on the first preference and policy information signal. The second preference and policy information signal is also based on Operator preference and policy information other than that provided in the first preference and policy signal. The second preference and policy signal may include assistance data/policies, IMS service continuity information, inter-system mobility policy information and access network discovery information, as described above.

For example only, the first preference and policy information signal may indicate that a $3^{rd}$ generation access network or PS network is preferred by an Operator over a WLAN or a Wi-Fi access network. The ANDSF module may override the SCC AS due to the active session being an emergency session and use a WLAN or a Wi-Fi access network, a CS network, and/or a non-$3^{rd}$ generation network. This may occur when the SCC AS and/or the SRD prefers a PS network access.

As another example, the first preference and policy information signal may indicate that a first access network is preferred by an Operator over a second access network due to IMS service continuity, load balancing, network mobility, operator preferences, roaming agreements, etc. in a shared access network. The ANDSF module may prioritize and/or weight the information provided by the SCC AS with other operator preferences and policies. The other operator preferences and policies may include load balancing, network mobility information, operator preferences, roaming agreements, emergency information, etc. and generate the second preference and policy information signal accordingly. The second preference and policy information signal may be provided to the SRD as a set of rules to follow when selecting an access network from a list of access networks. The list of access networks may be provided to the SRD via the second preference and policy information signal and based on the priorities and weights given to each of the preferences and policies.

In step 210C, the SRD selects on access network based on the second preference and policy information signal. The second preference and policy information signal may be transmitted to the SRD via a S14 interface. Control may proceed to step 214 after completion of step 210.

In step 212, normal mobility mechanisms or non-IMS level mobility mechanisms are performed. In step 212A, the ANDSF module generates a preference and policy signal. The preference and policy signal may include assistance data/policies, inter-system mobility policy information and access network discovery information, as described above. In step 212B, the SRD selects an access network based on the preference and policy signal of step 212A.

In step 214, the SRD may perform a predefined session transfer procedure based on one of the selected access networks of steps 210 and 212. The method may end at 216. The above-described steps in FIG. 5 are meant to be illustrative examples; the steps may be performed sequentially, synchronously, simultaneously, continuously, during overlapping time periods or in a different order depending upon the application.

The above described embodiments provide a single source (ANDSF module) and a single SRD network interface (S14) for network discovery and selection policy transfer for IMS service continuity. This provides improved synchronization and harmonization for multiple different session transfers and during SRD idle and active modes. The single source can serve as a centralized location where an increased number of parameters may be analyzed and weighted for improved session transfer decisions and policy generation. The parameters may be associated with network discovery and selection, as well as IMS service continuity.

The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. An access network discovery and selection module comprising:
   a first transceiver configured to receive a service continuity signal from a service centralization and continuity application server via a first interface, wherein the first interface is connected between the service centralization and continuity application server and the access network discovery and selection module; and
   a first control module configured to generate a preference and policy information signal based on the service continuity signal, wherein the preference and policy information signal includes a list of access networks available for selection by a service request device,
   wherein the first transceiver is configured to transmit the preference and policy information signal from the access network discovery and selection module to the service request device via a second interface, and
   wherein the second interface is connected between the access network discovery and selection module and the service request device.

2. The access network discovery and selection module of claim 1, wherein the service centralization and continuity application server is configured to generate the service continuity signal to maintain an active session of the service request device during at least one of a handover and a session transfer.

3. The access network discovery and selection module of claim 1, wherein the service centralization and continuity application server is configured to generate the service continuity signal to maintain:
   packet switched to circuit switched service continuity using Internet protocol multimedia system centralized services;
   packet switched to packet switched service continuity between a $3^{rd}$ generation access network and a non-$3^{rd}$ generation access network; or
   packet switched to packet switched service continuity in conjunction with packet switched to circuit switched service continuity.

4. The access network discovery and selection module of claim 1, wherein (i) the first transceiver is configured to receive the service continuity signal and (ii) the first control module is configured to generate the preference and policy information signal based on an indication of a handover of the service request device between a first access network and a second access network.

5. The access network discovery and selection module of claim 1, wherein:
   the first transceiver is configured to receive the service continuity signal based on an indication of a session transfer of the service request device; or
   the first control module is configured to generate the preference and policy information signal based on an indication of a session transfer of the service request device.

6. The access network discovery and selection module of claim 1, wherein the service continuity signal is an Internet protocol multimedia system service continuity signal.

7. An access network discovery and selection module comprising:
   a first transceiver configured to receive a service continuity signal from a service centralization and continuity application server; and
   a first control module configured to generate a preference and policy information signal based on the service continuity signal, wherein the preference and policy information signal includes a list of access networks available for selection by a service request device,
   wherein the first transceiver is configured to transmit the preference and policy information signal from the access network discovery and selection module to the service request device, and
   wherein at least one of (i) the first transceiver is configured to receive the service continuity signal and (ii) the first control module is configured to generate the preference and policy information signal based on an indication of an Internet protocol address change of the service request device.

8. The access network discovery and selection module of claim 7, wherein:
   the first control module is configured to generate the preference and policy information signal when the indication is true, and the first control module is configured to not generate the preference and policy information signal when the indication is false.

9. The access network discovery and selection module of claim 1 wherein at least one of:
the first transceiver is configured to receive the service continuity signal based on use of an Internet protocol multimedia system level mechanism to maintain service continuity for the service request device; and
the first control module is configured to generate the preference and policy information signal based on use of an IMS-Internet protocol multimedia system level mechanism to maintain service continuity for the service request device.

10. An access network discovery and selection module comprising:
a first transceiver configured to receive a service continuity signal from a service centralization and continuity application server; and
a first control module configured to generate a preference and policy information signal based on the service continuity signal, wherein the preference and policy information signal includes a list of access networks available for selection by a service request device,
wherein the first transceiver is configured to transmit the preference and policy information signal from the access network discovery and selection module to the service request device,
wherein
the first transceiver is configured to receive the service continuity signal based on use of an Internet protocol multimedia system level mechanism to maintain service continuity for the service request device, or
the first control module is configured to generate the preference and policy information signal based on use of an Internet protocol multimedia system level mechanism to maintain service continuity for the service request device,
wherein the first control module is configured to generate the preference and policy information signal when the Internet protocol multimedia system level mechanism is used to maintain service continuity of the service request device, and
wherein the first control module is configured to not generate the preference and policy information signal when the Internet protocol multimedia system level mechanism is not used to maintain service continuity of the service request device.

11. An access network discovery and selection module comprising:
a first transceiver configured to receive a service continuity signal from a service centralization and continuity application server; and
a first control module configured to generate a preference and policy information signal based on the service continuity signal, wherein the preference and policy information signal includes a list of access networks available for selection by a service request device,
wherein the first transceiver is configured to transmit the preference and policy information signal from the access network discovery and selection module to the service request device, and
wherein the first control module is configured to generate the preference and policy information signal independent of the service continuity signal and based on at least one of (i) an indication of an Internet protocol address change of the service request device and (ii) use of an Internet protocol multimedia system level mechanism to maintain service continuity of the service request device.

12. The access network discovery and selection module of claim 1, wherein the service continuity signal comprises at least one of load balancing information and operator access network type preferences.

13. The ANDSF access network discovery and selection module of claim 1, wherein the preference and policy information signal comprises inter-system mobility policy information and access network discovery information.

14. The access network discovery and selection module of claim 1, wherein the preference and policy information signal comprises validity conditions.

15. The access network discovery and selection module of claim 14, wherein the validity conditions indicate when access network discovery information is valid and locations where the access network discovery information applies to the service request device.

16. The access network discovery and selection module of claim 14, wherein the preference and policy information signal comprises:
access types available to the service request device;
access identifications for an access type; and
an indication of whether mobility is permitted for the service request device.

17. A network system comprising:
the access network discovery and selection module of claim 1; and
the service centralization and continuity application server,
wherein the service centralization and continuity application server comprises a second control module configured to transmit the service continuity signal to the access network discovery and selection module via a second transceiver.

18. A network system comprising:
the access network discovery and selection module of claim 1; and
the service request device,
wherein the service request device comprises:
a second transceiver configured to receive the preference and policy information signal; and
a second control module configured to select an access network based on the preference and policy information signal.

* * * * *